United States Patent [19]

Kawai et al.

[11] Patent Number: 4,626,565

[45] Date of Patent: Dec. 2, 1986

[54] PREPARATION PROCESS FOR POLYPROPYLENE-BASE RESIN COMPOSITIONS

[75] Inventors: Yoichi Kawai; Masaru Abe; Katsumi Sekiguchi; Akio Yoshihara; Shigeru Hayashi, all of Yokohama, Japan

[73] Assignee: Mitsui Toatsu Chemicals, Incorporated, Tokyo, Japan

[21] Appl. No.: 722,013

[22] PCT Filed: Aug. 17, 1984

[86] PCT No.: PCT JP8400403

§ 371 Date: Mar. 29, 1985

§ 102(e) Date: Mar. 29, 1985

[30] Foreign Application Priority Data

Aug. 18, 1983 [JP] Japan ................... 58-149609

[51] Int. Cl.$^4$ .............. C08L 53/00; C08L 23/16; C08K 3/00; C08K 5/14
[52] U.S. Cl. .................... 524/423; 524/424; 524/426; 524/433; 524/436; 524/437; 524/445; 524/451; 524/505
[58] Field of Search .......... 524/505, 423, 424, 426, 524/433, 436, 537, 445, 451

[56] References Cited

U.S. PATENT DOCUMENTS

| 4,363,885 | 12/1982 | Fukii et al. .................. 525/88 |
| 4,480,065 | 10/1984 | Kawai et al. ................. 525/88 |

FOREIGN PATENT DOCUMENTS

| 064257 | 6/1978 | Japan . | |
| 0001386 | 1/1979 | Japan .................... | 525/88 |
| 139447 | 10/1980 | Japan . | |
| 055942 | 4/1982 | Japan . | |
| 137341 | 8/1982 | Japan . | |
| 159842 | 10/1982 | Japan . | |
| 032650 | 2/1983 | Japan . | |
| 0162652 | 9/1983 | Japan .................... | 525/505 |
| 0168649 | 10/1983 | Japan .................... | 525/88 |
| 0168648 | 10/1983 | Japan .................... | 525/505 |
| 0187049 | 10/1984 | Japan .................... | 525/88 |
| 2121420 | 12/1983 | United Kingdom ......... | 524/505 |

OTHER PUBLICATIONS

Derwent Abst. 41211b/22 Ube Ind J54048847 4–1979.
Derwent Abst. 41405b/22 Ube Ind J54050057 4–1979.
Derwent Abst. 83-822910/47 J58173145 Tokuyama 10–1983.
Derwent Abst. 83-780668/40 J58145746 Tokuyama 8–1983.
Derwent Abst. 57634 K/24 J58076444 Mitsubishi 5–1983.

*Primary Examiner*—Herbert J. Lilling
*Attorney, Agent, or Firm*—McGlew and Tuttle

[57] ABSTRACT

Disclosed herein is a preparation process for polypropylene-base resin compositions, which process comprises heating at a temperature of 170°–280° C. a mixture containing a crystalline ethylenepropylene block copolymer having a specific composition, an ethylenepropylene copolymer rubber having a specific composition and viscosity, an inorganic filler having a specific particle size, and an organic peroxide, all in specified amounts. The thus-obtained polypropylene-base resin compositions are suitable for use in the production of large moldings such as automobile bumpers, fenders and body sidemembers because of their excellent low-temperature impact resistance, high molding fluidity, good paintability and high stiffness as well as their low preparation cost.

7 Claims, No Drawings

PREPARATION PROCESS FOR POLYPROPYLENE-BASE RESIN COMPOSITIONS

DESCRIPTION

1. Technical Field

This invention relates to a process for preparing polypropylene-base resin compositions having excellent low-temperature impact resistance, high molding fluidity, superb paintability and high stiffness.

2. Background Art

Although polypropylene resins have heretofore been used widely in various fields because of their excellent physical properties such as low specific gravity, high stiffness, and superb chemical and heat resistance, they are accompanied by a drawback in that they have poor impact resistance at low temperatures. With a view toward overcoming this drawback, it has been practiced to subject propylene to copolymerization with ethylene or to blend a rubber-like substance such as an ethylene-propylene copolymer or polyethylene with polypropylene. In addition, it is also commonly practiced to improve their stiffness, heat resistance, dimensional stability, paintability and the like by incorporating a variety of fillers in polypropylene resins.

Given these conditions, it is, however, required for polypropylene resins to fulfill such mutually contradictory properties as high stiffness, high heat resistance, easy paintability and high molding fluidity in combination with high impact resistance. Moreover, each of the above properties is required at a high level.

A variety of improvements have been proposed for the above requirements to date. Most of these proposals are, however, insufficient to meet and balance the high degrees of physical properties required. Therefore, it may be required in many instances to add a rubber component, fillers and so on at higher concentrations to polypropylene resins, resulting in increased costs.

DISCLOSURE OF THE INVENTION

An object of this invention is to provide a preparation process for inexpensive polypropylene-base resin compositions having excellent low-temperature impact resistance, high molding fluidity and high stiffness.

Another object of this invention is to provide a preparation process for polypropylene-base resin compositions suitable for use in the production of large moldings such as automobile bumpers, fenders and body sidemembers.

The present invention thus provides the following preparation process for polypropylene-base resin compositions:

A process for preparing polypropylene-base resin compositions, which process comprises heating at a temperature of 170° C.–280° C. a mixture containing:

(a) a crystalline ethylene-propylene block copolymer having an ethylene content of 7–30 wt. % and having a portion of 65 wt. % or more insoluble in boiling n-heptane;

(b) an ethylene-propylene copolymer rubber having a propylene content of 40–65 wt. % and a Mooney viscosity of 15–80 at 100° C.;

(c) an inorganic filler having particle sizes of 6 μm or smaller; and (d) an organic peroxide, said components (a), (b), (c) and (d) being contained in amounts of 65–95 wt. %, 35–5 wt. %, 2–25 wt. % and 0.001–0.5 wt. %, respectively, all based on the total amount of components (a) and (b).

BEST MODE FOR CARRYING OUT THE INVENTION

The crystalline ethylene-propylene block copolymer useful in the practice of this invention has an ethylene content of 7–30 wt. % and having a portion of 65 wt. % or more insoluble in boiling n-heptane. If the above ethylene content is less than 7 wt. %, the paintability and impact resistance of the resulting molding is reduced. On the other hand, any ethylene content greater than 30 wt. % reduces the modulus of flexural elasticity of the resulting molding. Thus, it is preferable not to use the crystalline ethylene-propylene block copolymer in any amounts outside the above range.

The ethylene-propylene copolymer rubber, which is also useful in the practice of this invention, is limited to those having propylene contents of 40–65 wt. % and Mooney viscosities of 15–80 at 100° C. If the propylene content is less than 40 wt. % in the above ethylene-propylene copolymer rubber, the resulting molding has poor appearance and reduced low-temperature impact resistance. On the other hand, any propylene content in excess of 65 wt. % leads to moldings having lowered moduli of flexural elasticity and poor paintability. Accordingly, it is preferable not to incorporate the ethylene-propylene copolymer rubber in any amounts outside the above-defined range. If an ethylene-propylene copolymer rubber having a Mooney viscosity smaller than 15 or greater than 80 is added to the above crystalline ethylene-propylene block copolymer, the particle sizes of the thus-dispersed ethylene-propylene copolymer rubber become excessively small or large and the physical properties of the resulting moldings become imbalanced. Hence, it is preferable not to use ethylene-propylene copolymer rubbers having Mooney viscosities outside the above-defined range.

In the present invention, the ethylene-propylene copolymer rubber is incorporated in an amount of 5–35 parts by weight per 100 parts by weight of the total amount of the crystalline ethylene-propylene block copolymer and the ethylene-propylene copolymer rubber. Any amounts lower than 5 parts by weight reduces impact resistance and paintability of the resulting moldings. If the amount of the ethylene-propylene copolymer rubber exceeds 35 parts by weight, the molding fluidity of the resulting composition is lowered and the modulus of flexural elasticity of the resulting molding is reduced. Therefore, it is preferable not to incorporate the ethylene-propylene copolymer rubber in any amounts outside the above-defined range.

As illustrative inorganic fillers useful in the practice of this invention, may be mentioned calcium oxide, magnesium oxide, calcium hydroxide, magnesium hydroxide, aluminum hydroxide, magnesium carbonate, calcium carbonate, barium sulfate, talc, clay, glass powder, dolomite, pirssonite, or the like, each having a particle size of 6 μm or smaller or, preferably, 5 μm or smaller. Use of calcium carbonate, barium sulfate or talc is particularly preferable. These inorganic fillers may be used either singly or in combination.

If one or more of the above inorganic fillers, the particle sizes of which exceed 6 μm, is used, the impact resistance of the resulting polypropylene-base resin composition is lowered.

As methods commonly employed for the determination of particle sizes of inorganic fillers, there are various definitions such as Green's or Feret's particle size, Goebelein's particle size, Nussenstein's particle size and Stokes's particle size. Particle sizes may be measured in accordance with a variety of measurement methods as given in the "Chemical Industry Handbook".

The term "particle size" as used herein means Nussenstein's particle size which is determined by the photo-extinction method. Measurement of particle size may be carried out by using, for example, a photo-extinction particle size distribution analyzer Model SKC-2000 (manufactured by Seishin Kigyo Company). As particle size, that corresponding to 50% of the cumulative particle size distribution (generally called "$D_{50}$") may be used.

The proportion of the inorganic filler having a particle size of 6 μm or smaller to be added in the present invention may range from 2–25 parts by weight based on 100 parts by weight of the total amount of the resin components consisting of the crystalline ethylene-propylene block copolymer and the ethylene-propylene copolymer rubber. Any proportions smaller than 2 parts by weight are too small to improve stiffness. Stiffness may be further improved to a certain degree as the proportion of the inorganic filler increases beyond 25 parts by weight. However, the incorporation of the inorganic filler in any amounts greater than 25 parts by weight lowers paintability. Because of the hygroscopicity of the incorporated inorganic filler, in particular, swelling may develop between the resin layer and the coating layer, resulting in poor resistance to warm water and moisture. Therefore, it is preferable not to add the inorganic filler in any amounts outside the above-defined range.

Examples of organic peroxides useful in the practice of this invention include t-butyl peroxypivalate, lauroyl peroxide, benzoyl peroxide, cyclohexanone peroxide, t-butyl peroxyisopropylcarbonate, t-butyl peroxybenzoate, methyl ethyl ketone peroxide, dicumyl peroxide, 2,5-dimethyl-2,5-di(6-butylperoxy)hexane, di-t-butyl peroxide, 2,5-dimethyl-2,5-di(t-butylperoxy)hexyne-3, or the like. These organic peroxides may be used either singly or in combination.

The proportion of the organic peroxide may range from 0.001 to 0.5 part by weight or, preferably, from 0.01 to 0.3 part by weight based on 100 parts by weight of the total amount of the crystalline ethylene-propylene block copolymer and the ethylene-propylene copolymer rubber. Any amounts smaller than 0.001 part by weight result in resin compositions having small melt flow indexes and hence poor molding fluidity. If the amount of the organic peroxide exceeds 0.5 part by weight, on the other hand, the molecular weight of the resin component of the resulting resin composition of this invention becomes too small to render the resin composition suitable for practical applications.

It is also possible to add, either singly or in combination, antioxidants, heat stabilizers, ultraviolet absorbents, fire retardants, nucleating agents, organic or inorganic pigments and the like which are routinely employed in polypropylene resins, so long as their amounts are limited to the extent that they do not impair the advantages of the present invention.

The mixing of the components (a)–(d) in this invention may be carried out using a Henschel mixer or the like commonly employed in the art. Although the heating of the resulting mixture may be effected by means of a Banbury mixer, a warming-up mill, or the like, it is generally desirable to knead the resulting mixture in a molten state and then to form it into pellets by means of a single-screw extruder or a double-screw extruder. In this case, the temperature of the extruder may vary depending on the types and amounts of the crystalline ethylene-propylene block copolymer and the organic peroxide to be used. It is, however, necessary to control it within 170°–280° C. Any temperatures lower than 170° C. are too low to achieve thermal degradation to any sufficient degree, thereby failing to bring about the advantages of this invention to any significant extent. Even if heat processing is carried out at a temperature higher than 280° C., no significant increase can be observed with respect to the thermal degradation effect. It is undesirable to raise the temperature of the extruder to an excessively high level, because such a high temperature causes the resin composition to undergo thermal decomposition.

The thus-obtained resin composition may be formed into desired moldings in accordance with commonly-employed molding methods, for example, by the injection molding method, the extrusion molding method, the compression molding method, and the like.

The invention will next be described more specifically in the following Examples and Comparative Examples, in which melt flow indexes, moduli of flexural elasticity and Izod impact strengths were measured in accordance with ASTM D-1238, ASTM D-790 and ASTM D-256, respectively:

EXAMPLE 1

Mixed in a Henschel mixer were 80 parts by weight of a crystalline ethylene-propylene block copolymer (hereinafter called "PP-A") having an ethylene content of 8.5 wt. % and having a portion of 92.0 wt. % insoluble in boiling n-heptane and a melt flow index of 1.3, 20 parts by weight of an ethylene-propylene copolymer rubber having a propylene content of 50 wt. % and a Mooney viscosity of 24 at 100° C. (hereinafter referred to as "EPR-A"), talc having a particle size of 1.3 μm in an amount of 5 parts by weight based on 100 parts by weight of the total amount of the crystalline ethylene-propylene block copolymer and the ethylene-propylene copolymer rubber, 2,5-dimethyl-2,5-di(t-butylperoxy)hexane in an amount of 0.13 part by weight based on 100 parts by weight of the total amount of the crystalline ethylene-propylene block copolymer and the ethylene-propylene copolymer rubber, and small amounts of a thermal stabilizer and antioxidant. The resulting mixture was pelletized at 210° C. through an extruder. The thus-obtained pellets were formed into prescribed specimens using an injection-molding machine, followed by measurement of the physical properties of the specimens. Their paintability was evaluated in accordance with the following method:

A two-liquid type priming paint of an acrylic component-chlorinated polypropylene system was coated to a film thickness of 10 μm over each of the specimens obtained using the above injection-molding machine. Thereafter, a two-liquid type top-coating paint of an acrylic component-urethane system was applied to a thickness of 25 μm over the primed specimens. After drying the thus-primed and top-coated specimens at 90° C. and for 30 minutes, they were allowed to stand at room temperature for 24 hours, thereby obtaining specimens useful in a paintability test. Using a cutter, a grid pattern of 100 1-mm squares was cut through the coating of each specimen. After applying adhesive tape over the cross-hatched areas, the tape was quickly pulled off. The ratio of remaining squares of the coating was determined in terms of percentage, on which the initial adherence was evaluated (the grid-patterned pulling-off test). In addition, specimens useful in the paintability test were immersed for 240 hours in warm water of 40° C. and their warm water resistance was then evaluated by observing the state of the surfaces of the coatings and subjecting them to the grid-patterned pulling-off test.

Further, after allowing the above-obtained pellets to stand for one week in an atmosphere of 30° C. and 90% R.H., they were formed into plates 160 mm long, 80 mm wide and 2 mm thick by means of an injection-molding machine. Surfaces of the resulting moldings were observed. The melt flow indexes of the thus-obtained polypropylene resins, moduli of flexural elasticity and Izod impact strengths measured on the specimens, evaluation results of the paintability of the specimens and surface conditions of the moldings are all given in Table 1.

EXAMPLES 2 and 3

The procedures of Example 1 were repeated escept that talc was added in amounts of 2 parts by weight and 10 parts by weight, respectively, for Examples 2 and 3. Test results are given in Table 1.

COMPARATIVE EXAMPLE 1

The procedures of Example 1 were followed except for the omission of talc. Test results are given also in Table 1.

COMPARATIVE EXAMPLE 2

The procedures of Example 1 were followed except that talc was added in an amount of 30 parts by weight. Test results are shown in Table 1.

COMPARATIVE EXAMPLE 3

The procedures of Example 1 were repeated except that talc having a particle size of 7.0 μm was used in lieu of talc having a particle size of 1.3 μm. Test results are shown in Table 1.

EXAMPLES 4 and 5

The procedures of Example 1 were repeated except that barium sulfate having a particle size of 1.2 μm and calcium carbonate having a particle size of 1.9 μm, respectively, for Examples 4 and 5, were used as inorganic fillers in place of talc having a particle size of 1.3 μm. Test results are given also in Table 1.

TABLE 1

| | Comp. Ex. 1 | Ex. 1 | Ex. 2 | Ex. 3 | Comp. Ex. 2 | Comp. Ex. 3 | Ex. 4 | Ex. 5 |
| --- | --- | --- | --- | --- | --- | --- | --- | --- |
| Composition (parts by weight) | | | | | | | | |
| PP-A | 80 | 80 | 80 | 80 | 80 | 80 | 80 | 80 |
| EPR-A | 20 | 20 | 20 | 20 | 20 | 20 | 20 | 20 |
| Talc (1.3 μm) | 0 | 5 | 2 | 10 | 30 | — | — | — |
| Talc (7.0 μm) | — | — | — | — | — | 5 | — | — |
| Barium sulfate (1.2 μm) | — | — | — | — | — | — | 5 | — |
| Calcium carbonate (1.9 μm) | — | — | — | — | — | — | — | 5 |
| Organic peroxide | 0.13 | 0.13 | 0.13 | 0.13 | 0.13 | 0.13 | 0.13 | 0.13 |
| Measurement results of physical properties | | | | | | | | |
| Melt flow index (g/10 min.) | 9.6 | 9.0 | 9.1 | 9.0 | 8.2 | 9.1 | 9.5 | 9.3 |
| Modulus of flexural elasticity (Kg/cm$^2$) | 6800 | 10500 | 8500 | 11400 | 18300 | 8900 | 9000 | 9500 |
| Izod −40° C. notched (Kg · cm/cm) | not broken | 20.5 | not broken | 19.1 | 7.8 | 5.5 | 32.5 | 19.8 |
| Paintability (1/100) Initial | 100/100 | 100/000 | 100/100 | 100/100 | 100/100 | 100/100 | 100/100 | 100/100 |
| Paintability (1/100) Warm water resistance | 100/100 | 100/100 | 100/100 | 100/100 | 68/100 | 95/100 | 100/100 | 100/100 |
| Appearance* | | | | | X | X | | |

*: Good; X: Poor

EXAMPLE 6

The procedures of Example 1 were followed except that, in place of EPR-A, an ethylene-propylene copolymer rubber having a propylene content of 55 wt. % and a Mooney viscosity of 47 at 100° C. (hereinafter referred to as "EPR-B") was used. Test results are shown in Table 2.

EXAMPLE 7

The procedures of Example 1 were repeated except that EPR-A was replaced by an ethylene-propylene copolymer rubber having a propylene content of 53 wt. % and a Mooney viscosity of 72 at 100° C. (hereinafter referred to as "EPR-C"). Test results are shown in Table 2.

COMPARATIVE EXAMPLE 4

The procedures of Example 1 were followed except that, in place of EPR-A, an ethylene-propylene copolymer rubber having a propylene content of 27 wt. % and a Mooney viscosity of 70° at 100° C. (hereinafter referred to as "EPR-D") was employed. Test results are given in Table 2.

EXAMPLE 8

The procedures of Example 1 were repeated except that PP-A and EPR-A were added in amounts of 70 parts by weight and 30 parts by weight, respectively. Test results are shown in Table 2.

COMPARATIVE EXAMPLE 5

The procedures of Example 1 were repeated except that PP-A and EPR-A were added in amounts of 50 parts by weight and 50 parts by weight, respectively. Test results are shown in Table 2.

EXAMPLE 9

The procedures of Example 1 were followed except that a crystalline ethylene-propylene block copolymer having an ethylene content of 7.8 wt. % and having a portion of 93.5 wt. % insoluble in boiling heptane and a melt flow index of 3.5 (hereinafter referred to as "PP-B") was used instead of PP-A and that the organic peroxide was added in an amount of 0.03 part by weight. Test results are shown in Table 2.

COMPARATIVE EXAMPLE 6

The procedures of Example 1 were repeated except for the omission of the organic peroxide. Test results are shown in Table 2.

COMPARATIVE EXAMPLE 7

The procedures of Example 1 were repeated except that the organic peroxide was added in an amount of 0.6 part by weight. Test results are shown in Table 2.

COMPARATIVE EXAMPLE 8

From the PP-A, EPR-A, talc, organic peroxide, thermal stabilizer and antioxidant used in Example 1, the PP-A, EPR-A, organic peroxide, thermal stabilizer and antioxidant were pelletized in the same manner as in Example 1. Talc was then added to the resultant pellets, followed by pelletization of the resulting mixture in a similar manner. The thus-obtained pellets were formed into specimens by an injection-molding machine. It was observed that talc was poorly distributed in the resultant specimens. This problem was particularly remarkable in planar specimens. Accordingly, their physical property measurement and paintability test were omitted.

TABLE 2

| | Ex. 6 | Ex. 7 | Comp. Ex. 4 | Ex. 8 | Comp. Ex. 5 | Ex. 9 | Comp. Ex. 6 | Comp. Ex. 7 |
|---|---|---|---|---|---|---|---|---|
| Composition (parts by weight) | | | | | | | | |
| PP-A | 80 | 80 | 80 | 70 | 50 | — | 80 | 80 |
| PP-B | — | — | — | — | — | 80 | — | — |
| EPR-A | — | — | — | 30 | 50 | 20 | 20 | 20 |
| EPR-B | 20 | — | — | — | — | — | — | — |
| EPR-C | — | 20 | — | — | — | — | — | — |
| EPR-D | — | — | 20 | — | — | — | — | — |
| Talc (1.3 μm) | 5 | 5 | 5 | 5 | 5 | 5 | 5 | 5 |
| Organic peroxide | 0.13 | 0.13 | 0.13 | 0.13 | 0.13 | 0.03 | 0 | 0.6 |
| Measurement results of physical properties | | | | | | | | |
| Melt flow index (g/10 min.) | 8.8 | 8.5 | 9.5 | 9.4 | 6.5 | 9.6 | 1.5 | 8.5 |
| Modulus of flexural elasticity | 10300 | 10200 | 9500 | 8800 | 4700 | 8900 | 13800 | 9200 |
| Izod —40° C. notched (Kg · cm/cm) | 20.7 | 25.0 | 6.5 | not broken | not broken | 19.8 | 27.5 | 3.8 |
| Paintability (1/100) Initial | 100/100 | 100/100 | 100/100 | 100/100 | 100/100 | 100/100 | 100/100 | 100/100 |
| Warm water resistance | 100/100 | 100/100 | 98/100 | 100/100 | 100/100 | 100/100 | 100/100 | 100/100 |
| Appearance* | | | X | | | | | X |

* : Good; X: Poor

We claim:

1. A process for preparing polypropylene-base resin compositions exhibiting a melt flow index value of at least 8.5 g/10 min., a modulus of flexural elasticity of at least 8500 kg/cm$^2$ and an Izod value, notched at —40° C., of at least 19.1 Kg.cm/cm, which process comprises heating at a temperature of 170° C.–280° C. a mixture containing:
   (a) a crystalline ethylene-propylene block copolymer having an ethylene content of 7–30 wt. % and having a portion of 65 wt. % or more insoluble in boiling n-heptane;
   (b) an ethylene-propylene copolymer rubber having a propylene content of 40–65 wt. % and a Mooney viscosity of 15–80 at 100° C.;
   (c) and inorganic filler having a particle size of 6 μm or smaller; and
   (d) an organic peroxide, said components (a), (b), (c) and (d) being contained in amounts of 65–95 wt. %, 35–5 wt. %, 2–25 wt. % and 0.001–0.5 wt. %, respectively, all based on the total amount of components (a) and (b).

2. A method according to claim 1, wherein the inorganic filler has a particle size of 5 μm or smaller.

3. A method according to claim 1, wherein the inorganic filler is selected from calcium oxide, magnesium oxide, calcium hydroxide, magnesium hydroxide, aluminum hydroxide, magnesium carbonate, calcium carbonate, barium sulfate, talc, clay, glass powder, dolomite or pirssonite.

4. A method according to claim 1, wherein the inorganic filler is selected from calcium carbonate, barium sulfate or talc.

5. A method according to claim 1, wherein the organic peroxide is selected from t-butyl peroxypivalate, lauroyl peroxide, benzoyl peroxide, cyclohexanone peroxide, t-butyl peroxyisopropyl-carbonate, t-butyl peroxybenzoate, methyl ethyl ketone peroxide, dicumyl peroxide, 2,5-dimethyl-2,5-di(t-butylperoxy)hexane, di-t-butyl peroxide or 2,5-dimethyl-2,5-di(t-butylperoxy)hexyne-3.

6. A method according to claim 1, wherein the components (a), (b), (c) and (d) are mixed and then heated to a temperature of 170°–280° C. for thermal degradation.

7. A method according to claim 1, wherein the components (a), (b), (c) and (d) are kneaded in a molten state at a temperature of 170°–280° C. and then pelletized for thermal degradation.

* * * * *